United States Patent
Sun et al.

(10) Patent No.: US 9,344,192 B1
(45) Date of Patent: May 17, 2016

(54) DRIVER CHIP FOR MINIMIZING TRANSMISSION IMPAIRMENTS AND FOR BOOSTING SIGNAL TRANSMISSION RATES

(71) Applicant: TITAN PHOTONICS, INC., Fremont, CA (US)

(72) Inventors: Chen-Kuo Sun, Escondido, CA (US); Paul N. Huntley, Poway, CA (US); Ali Ghiasi, Cupertino, CA (US); Charlie Chen, Santa Clara, CA (US); Dingbo Chen, San Diego, CA (US); Eric Liu, Fremont, CA (US)

(73) Assignee: INTEGRA RESEARCH AND DEVELOPMENT, LLC, Latham, NY (US)

( * ) Notice: Subject to any disclaimer, the term of this patent is extended or adjusted under 35 U.S.C. 154(b) by 12 days.

(21) Appl. No.: 14/548,836

(22) Filed: Nov. 20, 2014

(51) Int. Cl.
| | |
|---|---|
| *H04B 10/00* | (2013.01) |
| *H04B 10/25* | (2013.01) |
| *H04B 10/2575* | (2013.01) |
| *H04B 10/2507* | (2013.01) |

(52) U.S. Cl.
CPC ........ *H04B 10/2504* (2013.01); *H04B 10/2507* (2013.01); *H04B 10/2575* (2013.01)

(58) Field of Classification Search
CPC ........... H04B 10/2504; H04B 10/2507; H04B 10/2575
See application file for complete search history.

(56) References Cited

U.S. PATENT DOCUMENTS

| | | |
|---|---|---|
| 3,488,586 A | 1/1970 | Watrous |
| 3,794,841 A | 2/1974 | Cosentino |
| 4,812,641 A | 3/1989 | Ortiz Jr. |
| 5,379,141 A | 1/1995 | Thompson et al. |
| 5,526,161 A | 6/1996 | Suzuki et al. |
| 5,541,951 A | 7/1996 | Juhasz et al. |
| 5,596,436 A | 1/1997 | Sargis et al. |
| 5,680,104 A | 10/1997 | Slemon et al. |
| 5,777,768 A | 7/1998 | Korevaar |
| 5,871,449 A | 2/1999 | Brown |
| 6,091,074 A | 7/2000 | Korevaar |
| 6,118,131 A | 9/2000 | Korevaar |
| 6,263,077 B1 * | 7/2001 | Zuranski ............... H04L 1/0002 375/222 |
| 6,353,490 B1 | 3/2002 | Singer et al. |
| 6,493,485 B1 | 12/2002 | Korevaar |
| 6,538,789 B2 | 3/2003 | Sun |
| 6,686,800 B2 | 2/2004 | Krupka |

(Continued)

FOREIGN PATENT DOCUMENTS

| | | |
|---|---|---|
| EP | 1128197 A2 | 8/2001 |
| WO | 0069098 | 11/2000 |

(Continued)

*Primary Examiner* — Danny Leung
(74) *Attorney, Agent, or Firm* — Nydegger & Associates

(57) ABSTRACT

In accordance with the present invention, a driver chip is provided for transmitting optical signals over an optical fiber. The driver chip includes, in combination, a tapped delay equalizer, an amplifier and control circuitry. Operationally, the tapped delay equalizer modifies an input digital signal to create a compensated signal by compensating for anticipated impairments and distortions introduced during signal transmission. The amplifier then receives the compensated signal to provide gain and bias in order to establish a proper operating point for an E/O device. The control circuitry is interconnected with the tapped delay equalizer and with the amplifier to establish and control tap weights for the tapped delay equalizer to compensate for electrical and optical bandwidth limitations, along with optical dispersion effects.

20 Claims, 2 Drawing Sheets

(56) References Cited

U.S. PATENT DOCUMENTS

| | | | |
|---|---|---|---|
| 6,760,371 B1 * | 7/2004 | Bach | H04L 25/03038 375/231 |
| 6,928,248 B2 | 8/2005 | Archour et al. | |
| 6,944,403 B2 | 9/2005 | Margalit et al. | |
| 7,088,921 B1 | 8/2006 | Wood | |
| 7,146,103 B2 | 12/2006 | Yee et al. | |
| 7,428,385 B2 | 9/2008 | Lee et al. | |
| 7,525,460 B1 * | 4/2009 | Liu | G11B 20/10009 341/120 |
| 7,825,836 B1 * | 11/2010 | Liu | G11B 20/10009 341/111 |
| 8,463,124 B2 | 6/2013 | Sun | |
| 8,463,137 B2 | 6/2013 | Sun | |
| 8,483,566 B2 | 7/2013 | Sun | |
| 8,804,808 B1 * | 8/2014 | Dybdal | H04L 27/01 375/232 |
| 2002/0012495 A1 | 1/2002 | Sasai et al. | |
| 2002/0041728 A1 | 4/2002 | Yamashita et al. | |
| 2002/0076132 A1 | 6/2002 | Peral et al. | |
| 2003/0133716 A1 | 7/2003 | Frignac et al. | |
| 2004/0109696 A1 | 6/2004 | Toshihisa | |
| 2006/0165413 A1 | 7/2006 | Schemmann et al. | |
| 2007/0032256 A1 | 2/2007 | Kolze | |
| 2007/0150927 A1 | 6/2007 | Chapman | |
| 2007/0160165 A1 * | 7/2007 | Morgan | H04B 7/0857 375/299 |
| 2007/0206693 A1 | 9/2007 | Geile et al. | |
| 2009/0274462 A1 | 11/2009 | Yu | |
| 2010/0098147 A1 * | 4/2010 | Miller | H04L 25/03057 375/233 |
| 2010/0196013 A1 | 8/2010 | Franklin | |
| 2010/0272447 A1 | 10/2010 | Kolze et al. | |
| 2010/0329680 A1 | 12/2010 | Presi et al. | |
| 2011/0142449 A1 * | 6/2011 | Xie | H04B 10/60 398/65 |
| 2012/0027421 A1 | 2/2012 | Chen et al. | |
| 2012/0230692 A1 | 9/2012 | Sun | |
| 2015/0311974 A1 * | 10/2015 | Thompson | H04B 10/25751 398/13 |

FOREIGN PATENT DOCUMENTS

| WO | 20060135139 A1 | 12/2006 |
|---|---|---|
| WO | 20120122254 A2 | 9/2012 |

* cited by examiner

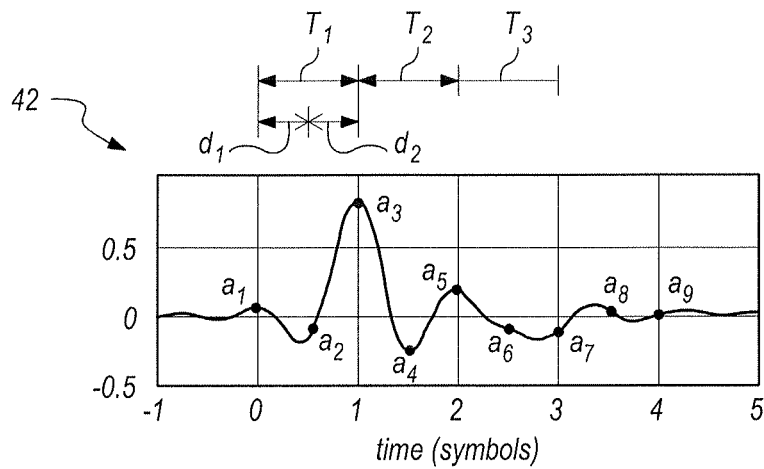
FIG. 4
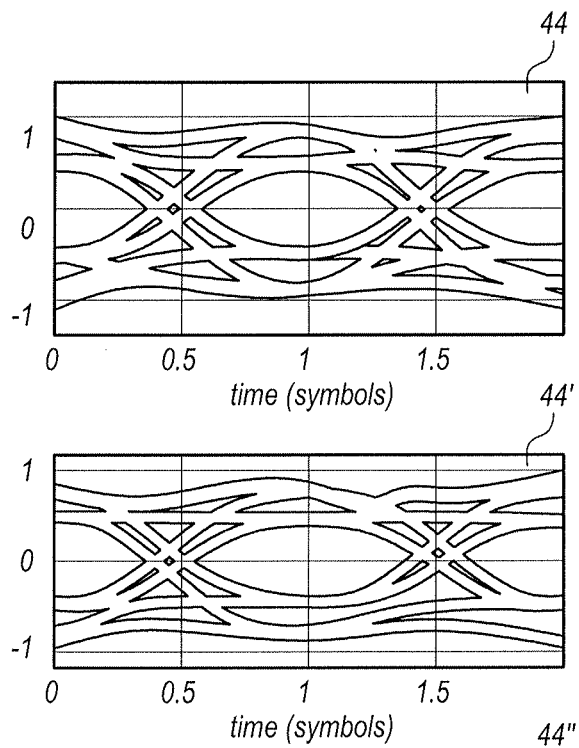
FIG. 5A
FIG. 5B
FIG. 5C

DRIVER CHIP FOR MINIMIZING TRANSMISSION IMPAIRMENTS AND FOR BOOSTING SIGNAL TRANSMISSION RATES

FIELD OF THE INVENTION

The present invention pertains generally to systems and methods for transporting an optical signal over a fiber optic. More particularly, the present invention pertains to systems and methods for shaping an electrical signal, to compensate for impairments, distortions and mismatch values that are introduced into the electrical signal during its conversion into an optical signal and its subsequent transmission over an optical fiber. The present invention is particularly, but not exclusively, useful for systems and methods that employ tapped delay equalizers having weighted taps to compensate for impedance mismatch impairments, electrical pre-distortions and transmission line losses during an optical signal transmission.

BACKGROUND OF THE INVENTION

Tapped delay equalizers are well known in pertinent signal processing technologies as being an effective means for shaping electrical signals. They are widely used in a variety of electric/optical environments, and they are employed for a plethora of different purposes. For the present invention, the electrical/optical environment of interest involves the transmission of optical signals over a fiber optic. Accordingly, a purpose here is to provide an effective driver chip for use in a system that includes Electrical/Optical (E/O) and Optical/Electrical (O/E) converters, which will optimize the quality of signal transmissions.

From a system perspective, it happens there are many ways in which a signal can be distorted and corrupted as it is being processed and transmitted. To some extent, but not entirely, the source and effect of these distortions and corruptions (i.e. impairments) are known, or can be predicted. Thus, they can be at least partially compensated for. For instance, these impairments can include: 1) transmission line losses, along with impedance mismatch distortions such as InterSymbol Interference (ISI) that can be introduced at interfaces between system components (e.g. driver chip, E/O converter, fiber optic, and O/E converter); 2) electrical and photonic signal distortions caused by impairments such as amplitude and group delay distortions, photon-carrier lifetime effects, and fiber dispersion; and 3) other additional impairments from signal characteristics that can be attributed to slow rise/fall time and laser relaxation peak effect and E/O device parasitics. The present invention, however, recognizes that all of the various impairments noted above can be collectively compensated for by the employment and proper configuration of an analog tapped delay equalizer.

The present invention also recognizes that an "eye diagram," of a type well known in the pertinent art, can be used to monitor the design, the signal-to-noise ratio (SNR), and the testing or reconfiguration of an analog tapped delay equalizer. When monitored, an optimal operation for the driver chip is indicated when the "eye" of the eye diagram is open to its greatest extent.

With the above in mind, it is an object of the present invention to provide a system and method for simultaneously minimizing operational and architectural impairments during the transmission of an optical signal over an optical fiber. Another object of the present invention is to establish tap weights for the tapped delay equalizer of a driver chip that can be controlled to minimize impairments and distortions to an output signal that are caused by transmission line losses and impedance mismatches, as well as other electrical and photonic impairments. Another object of the present invention is to optimize bandwidth and ISI performance. Yet another object of the present invention is to provide a driver chip for use in optimizing the transmission of an optical signal over an optical fiber that is easy to use, is simple to implement, and is comparatively cost effective.

SUMMARY OF THE INVENTION

In accordance with the present invention, a driver chip is provided for transmitting optical signals over an optical fiber. For purposes of this invention, the driver chip is designed and configured to minimize impairments to signal transmissions, and to thereby optimize the quality of these transmissions. Structurally, the driver chip includes, in combination: an analog tapped delay equalizer, an amplifier with gain and bias control, and control circuitry for maintaining an operation of the driver chip. It is an important aspect of the present invention that minimizing impairments and optimizing signal quality is accomplished simultaneously by providing a proper operating configuration of the tap weights for the tapped delay equalizer. Typically, the input signal for the driver chip will be a digital signal.

As is well known in the pertinent art, a digitally modulated signal has a characteristic symbol rate, $R_s$. By definition, this symbol rate, $R_s$, is equal to the number of symbol changes (i.e. waveform changes or signaling events) that are made per second. For a digital signal transmission, wherein each symbol has a time duration, T, the symbol rate is equal to the reciprocal of T (i.e. $R_s=1/T$). This relationship becomes particularly important when signal shaping is to be accomplished using an analog Feed Forward Equalizer (FFE), i.e. a tapped delay equalizer.

For purposes of the present invention, a tapped delay equalizer needs to be programmed (configured) for compliance with the symbol rate, $R_s$, of the digitally modulated input signal. In this context, additional considerations include the time delay, $d_n$, between adjacent taps, and the number of taps per symbol, N. In general, for a preferred embodiment of the present invention, time delay, $d_n$, will be less than the symbol time duration, T. Thus, there will always be at least one tap per symbol (i.e. N>1). Preferably, the number of taps, n, that are used with the tapped delay equalizer (FFE) will need to be three or more (n≥3). For the many reasons set forth elsewhere herein, a preferred embodiment of the present invention will include a tapped delay equalizer having two taps per symbol (N=2) and a total of nine taps (n=9).

In light of the above, the tapped delay equalizer is positioned on the driver chip to receive an input digital signal. As envisioned for the present invention and indicated above, the input digital signal may be of any type well known in the pertinent art, and as mentioned above it will be characterized by a symbol rate, $R_s$, where there is a time duration, T, for each symbol (i.e. $R_s=1/T$). The equalizer receiving this input digital signal will have an n-number of taps, and a time delay, $d_n$, between adjacent taps can be established as desired for the particular chip. Importantly, $d_n<T$. Preferably, $d_n$ is constant. Moreover, although $d_n$ is preferably the same between all adjacent taps (i.e. $d_{n-1}=d_n=d_{n+1}$), depending on the needs of the particular system, this may not necessarily be so (i.e. $d_{n-1} \neq d_n$ and/or $d_n \neq d_{n+1}$). In any event, the tapped delay equalizer is employed to modify the input digital signal, and to thereby create a compensated signal.

On the driver chip, the amplifier of the driver chip is connected with the tap delay equalizer for receiving the compensated signal. Further, in this combination, the amplifier provides gain for the signal, and it includes a biasing element to bias the compensated signal. Thus, bulky external bias circuitry is eliminated. Further, this on-chip control is provided to control average power and to stabilize laser operation. The general, overall purpose here is to create an electrical output signal for the driver chip which has a proper operating point.

In addition to the tapped delay equalizer and the amplifier, control circuitry is provided on, or off, the driver chip to interconnect with the other components. In detail, the connection between the amplifier and the control circuitry, either on or off the chip, is used to control a gain and a bias for the amplifier. On the other hand, its connection with the tapped delay equalizer is provided to control tap weights for individual taps of the tapped delay filter.

In a larger context, as part of a system, the driver chip will normally be electronically connected to an Electrical/Optical (E/O) converter which will convert the electrical output signal into an optical signal, λ. Also, in such a system, a low-pass filter can be inserted between the driver chip and the E/O converter to achieve the required spectrum shaping using fewer filter taps during a transmission of the optical signal, λ, over an optical fiber. In each instance, as noted above, these components (i.e. the E/O converter, the low-pass filter, and the fiber optic) will introduce impairments that need to be considered for compensation by analog FFE of the driver chip.

For an operation of the driver chip, the taps of the tapped delay equalizer are weighted. Specifically, this is done to minimize impairments to the output signal that may be caused by distortions, line losses and mismatch values that are introduced during creation of the optical signal, λ. As intended for the present invention, however, the taps can also be weighted to achieve other purposes.

During a setup of the driver chip of the present invention, an eye diagram can be used to verify its optimal operation.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4 is an exemplary graph of tap locations and respective tap weights presented on a time line for a 9 tap Gaussian equalizer employing 2-tap/symbol;

FIG. 5A is a representative eye diagram of an exemplary optical transmission system without equalization;

FIG. 5B is a representative eye diagram of the same optical transmission system considered for FIG. 5A which results when the system is equalized by a 3 tap Gaussian equalizer employing 1-tap/symbol; and FIG. 5C is a representative eye diagram of the same optical transmission system considered for FIGS. 5A and 5B which results when the system is equalized by a 9 tap Gaussian equalizer employing 2-taps/symbol.

DESCRIPTION OF THE PREFERRED EMBODIMENTS

Figure 1:
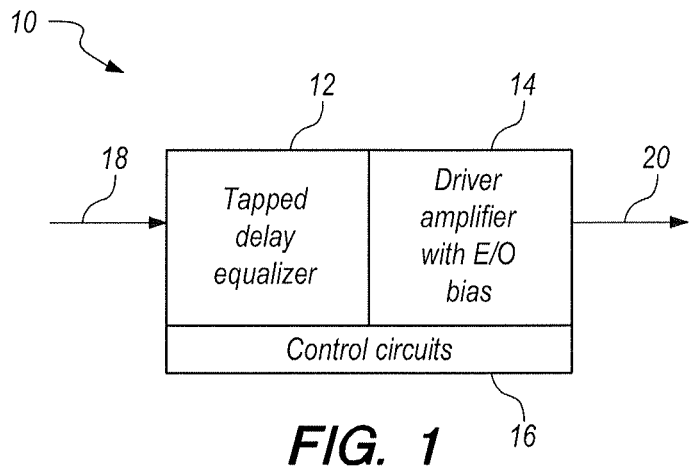
FIG. 1 is a schematic presentation of a driver chip in accordance with the present invention.

Referring initially to FIG. 1, a driver chip in accordance with the present invention is shown and is generally designated 10. As shown, the essential components of the driver chip 10 include: a tapped delay equalizer 12 (e.g. Feed Forward Equalizer [FFE]); an amplifier 14 with an Electrical/Optical (E/O) bias; and a control circuitry 16. Further, FIG. 1 indicates that an input signal 18 is fed directly to the tapped delay equalizer 12, and that a compensated signal 20 is created as an output of the driver chip 10. In this process, both the tapped delay equalizer 12 and the amplifier 14 are controlled by the circuitry 16. Note: although control circuitry 16 shown in FIG. 1 is an integral component of the driver chip 10, it will be appreciated by the skilled artisan that the control circuitry 16 can properly operate while separated from the substrate of driver chip 10.

Figure 2:
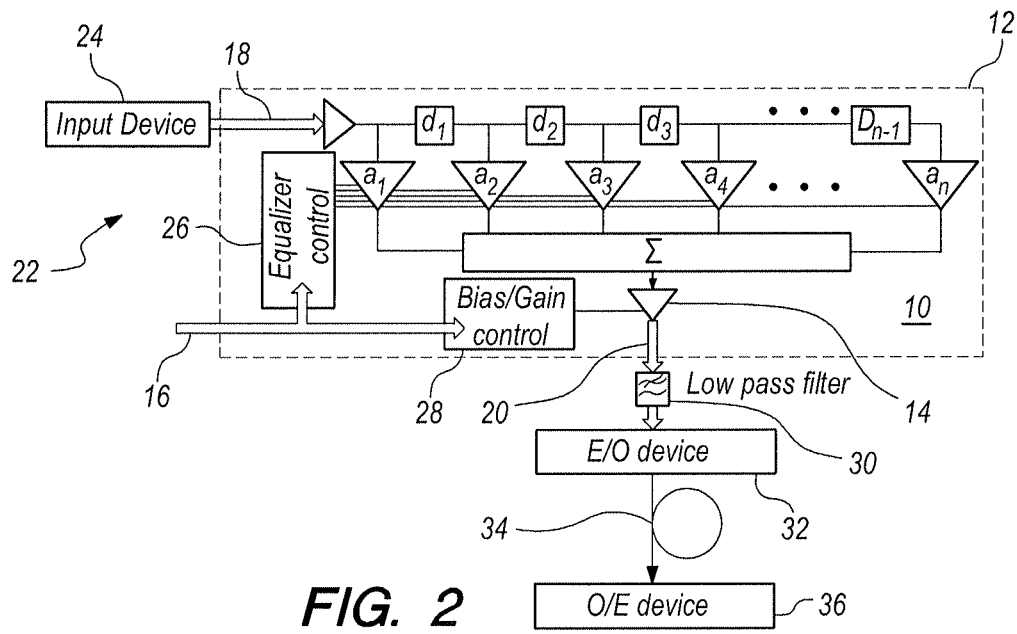
FIG. 2 is a detailed presentation of operational components of the driver chip in combination with system components required for transmission of an optical signal.

A system which establishes architecture for incorporating the driver chip 10 is shown in FIG. 2, where the system is generally designated 22. In FIG. 2 it will be seen that an input device 24 is provided to generate the input signal 18. As envisioned for the present invention, the input signal 18 will be either linear or digital. In either case, it will be characterized by a symbol rate, $R_s$, having a time duration, T, for each symbol of the signal 18 (i.e. $R_s=1/T$).

In detail, FIG. 2 shows that the tapped delay equalizer 12 has an n-number of taps, $a_n$, with a time delay, $d_n$, between adjacent taps (e.g. $a_n$ and $a_{n+1}$). Importantly, as noted above, in the relationship between the taps, $a_n$, of the tapped delay equalizer 12 and the symbol rate, $R_s$, of the digital input signal 18, it is necessary that $d_n$ be less than T, ($d_n<T$). Additionally, FIG. 2 shows that the control circuitry 16 includes an equalizer control 26 that is connected directly to each of the taps, $a_n$, and a bias/gain control 28 that is connected directly to the amplifier 14.

FIG. 2 further indicates that in the system 22, the driver chip 10 can be connected to a low pass filter 30 to achieve the required spectrum shaping using fewer filter taps. Additionally, an E/O device (converter) 32 is shown for converting the compensated signal 20 into an optical signal, λ. To achieve the purpose of the present invention, a fiber optic (transmission medium) 34 is shown for use in transporting the optical signal, λ, to an Optical/Electrical (O/E) device 36 (see FIG. 3) where it is reconverted to an electrical signal for further processing.

Figure 3:
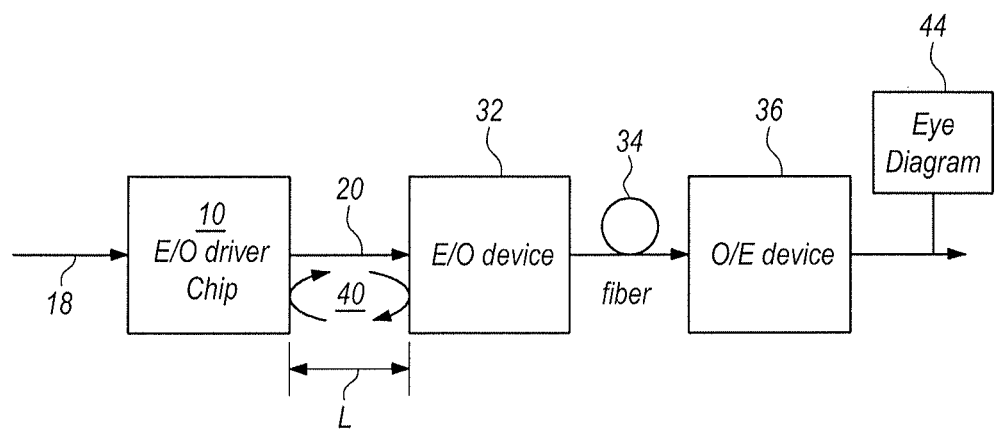
FIG. 3 is a schematic presentation of a typical electrical environment for the driver chip of the present invention, illustrating an impairment requiring mismatch compensation from the driver chip.

FIG. 3 is provided to illustrate an exemplary impedance mismatch 40 which requires compensation by the driver chip 10 of the present invention. In this example, the impedance mismatch 40 is shown to be the result of reflections that will occur between the driver chip 10 and the E/O device 32 of the system 22. In detail, the letter L shown in FIG. 3 indicates that a time delay can occur or develop between the E/O driver chip 10 and the E/O device 32. When this happens, the resultant separation will cause a round trip delay of 2L for any reflections between the driver chip 10 and the E/O device 32. As is well known, these reflections will create an impairment. The present invention, however, recognizes that such an impairment can be compensated for using the tapped delay equalizer 12 of the driver chip 10 when the 2L delay is less than about one half of the total tapped delay of the tapped delay equalizer (FFE) 12. Stated differently, the present invention envisions being able to provide a substantial correction for impedance mismatch (ISI) impairments when $2L \leq \Sigma d_n/2$.

As will be appreciated by anyone skilled in the pertinent art, there will likely be many other examples of impedance mismatches in the system 22, in addition to the impedance mismatch 40 illustrated in FIG. 3. Indeed, an overarching purpose for the driver chip 10 is to minimize all forms of impairments in the system 22, and to optimize the signal quality provided by the system 22. For the present invention, this is achieved by establishing a proper weighting configuration for the taps, $a_n$, in the tapped delay equalizer 12, and by maintaining a proper operating point for the E/O device 32.

A detailed description of pertinent transmission characteristics for a tapped delay equalizer (FFE) 12 of the present invention is presented as a schema 42 in FIG. 4. With reference to FIG. 4 it is to be appreciated that the schema 42 for the represented tap delayed equalizer (FFE) 12 has nine taps (i.e. n=9). In this example, as described above, the time duration, T, for each symbol is established based on characteristics of the input signal 18 and its symbol rate, $R_s$. With this in mind, recall that for any modulated digital input signal 18, $R_s$ and T are reciprocally related (i.e. $T=1/R_s$).

As represented in FIG. 4, the exemplary tapped delay equalizer (FFE) 12 has two taps per symbol (e.g. taps n=1 and n=2). Accordingly, respectively weighted samples $a_1$ and $a_2$ are both taken together in the first symbol having the time duration $T_1$. In this example, N=2. As further shown in this example, $d_n=T/2$ (i.e. $d_n<T$). The same organization for tap location pertains for the remaining symbols $T_2$ et seq.

In accordance with the present invention, a shaping of the input signal 18 is accomplished for the purpose of minimizing the effect of impairments on the output compensated signal 20. Importantly, this is done to minimize the effect of impairments caused by all sources required for the optical transmission of the input signal 18. As noted above, these impairments can include: 1) transmission line losses, along with impedance mismatch distortions that are introduced at interfaces between system components (e.g. driver chip, E/O converter, fiber optic, and O/E converter); 2) electrical and photonic signal distortions caused by impairments such as amplitude and group delay distortions, photon-carrier lifetime effects, and fiber dispersion; and 3) other additional impairments from signal characteristics that can be attributed to slow rise/fall time, and laser relaxation peak effect. In particular, compensation for these impairments is done by appropriately weighting the samples $a_n$ taken from the various taps of the tapped delay equalizer (FFE) 12.

As envisioned for the present invention, programming of the tapped delay equalizer 12 is done by first creating a test model of the intended signal transmission system. For the present invention this will include the driver chip 10 together with selected associated components, such as the E/O device 32, the low pass filter 30 (optional), the transmission medium 34 (e.g. fiber optic), and the O/E device 36. In this programming process, the collective response of components in a signal transmission system is monitored, and respective gains are set for the taps $a_n$ of the tapped delay equalizer 12 to minimize impairments caused by these components. Specifically, as intended for the present invention, the collective response is monitored using an eye diagram 44 of a type well known in the pertinent art.

In FIG. 3, it will be seen that the eye diagram 44 is preferably taken at the output of the O/E device 36. This positioning, however, is only exemplary. Moreover, it is to be appreciated that, regardless where the eye diagram 44 is placed, the compensation to be provided by the driver chip 10 will extend to all components throughout the particular signal transmission system.

Referring to FIGS. 5A-C, an operational validation of the driver chip 10 for the present invention is evidenced by sequentially presenting the results from a same optical transmission system. In sequence, the results from using three different configurations for the tapped delay equalizer 12 of the driver chip 10 are shown. The eye diagram 44 shown in FIG. 5A resulted when there was no equalization for the optical transmission system. In FIG. 5B, a system that has been equalized by a 3-tap (n=3) tapped delay equalizer 12, and that uses the conventional spacing of one tap per symbol, resulted in an eye diagram 44' which shows some slight improvement over the uncompensated eye diagram 44 of FIG. 5A. Eye diagram 44" in FIG. 5C, however, which resulted from the use of a 9-tap (n=9) tapped delay equalizer 12 with two taps per symbol, as disclosed and discussed above for a preferred embodiment of the present invention, shows a marked improvement over the less compensated configurations of tapped delay equalizer 12 shown in FIGS. 5A and 5B.

While the particular Driver Chip for Minimizing Transmission Impairments and for Boosting Signal Transmission Rates as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for minimizing transmission impairments and for boosting transmission rates during the transmission of an optical signal by a system including electronic components and an optical fiber, the method comprising the steps of:
   providing a source for a digital signal, wherein the digital signal is characterized by a symbol rate, $R_s$ with a time duration T for each symbol;
   inputting the digital signal into a tapped delay equalizer, wherein the equalizer has an n-number of taps with a time delay, $d_n$, between adjacent taps, where $R_s=1/T$ and $d_n<T$, wherein n is greater than three and further wherein the tapped delay equalizer shapes the digital signal to create a compensated signal;
   biasing the compensated signal to establish an electrical output signal;
   transferring the electrical output signal to an Electrical/Optical (E/O) device for converting the output signal to an optical signal, λ, having a constant optical power level;
   weighting respective taps of the tapped delay equalizer to minimize impairments introduced into the electrical output signal by the transmission system; and
   inserting the optical signal, λ, into an optical fiber for transmission of the optical signal, λ, over the optical fiber.

2. A method as recited in claim 1 further comprising the step of compensating for impairments, distortions and mismatch values introduced during creation and transmission of the optical signal, λ, by manipulating tap weights in the weighting step.

3. A method as recited in claim 2 wherein the efficacy of the compensating step is evaluated by monitoring an eye diagram.

4. A method as recited in claim 1 further comprising the steps of:
   setting a bias level for the E/O device in the biasing step;
   establishing default values for respective tap weights of the tapped delay equalizer in the weighting step; and selectively controlling the setting step and the establishing step for an optimal transmission of the optical signal, $\lambda$.

5. A method as recited in claim 1 further comprising the step of inserting a low-pass filter between an amplifier and the E/O device to achieve a required spectrum shaping.

6. A method as recited in claim 1 wherein the time delay, $d_n$, is established to create a sampling rate, s, for the tapped delay equalizer with $s > R_s$ to boost the transmission rate capability of the electrical output signal.

7. A driver chip for use in a system including an optical fiber for transmitting optical signals which comprises:
   a tapped delay equalizer for receiving an input digital signal, wherein the equalizer has an n-number of taps with a time delay, $d_n$, between adjacent taps, wherein the input digital signal is characterized by a symbol rate, $R_s$, with a time duration, T, for each symbol, wherein $n > 3$, $R_s = 1/T$ and $d_n < T$, and further wherein the tapped delay equalizer modifies the input digital signal to create a compensated signal;
   an amplifier connected with the tap delay equalizer for receiving the compensated signal, wherein the amplifier includes a biasing element to establish an electrical output signal from the compensated signal having a predetermined bias; and
   a control circuitry interconnected with the tapped delay equalizer and with the amplifier to respectively control a gain and a bias of the amplifier, together with control of respective tap weights for individual taps of the tapped delay filter to minimize impairments of the output signal caused by the system and to boost a signal transmission rate of the driver chip for a transmission of the electrical output signal as an optical signal, $\lambda$, over the optical fiber.

8. A driver chip as recited in claim 7 wherein the driver chip is electronically connected to an Electrical/Optical (E/O) converter for converting the electrical output signal to the optical signal, $\lambda$.

9. A driver chip as recited in claim 8 wherein a low-pass filter is inserted between the amplifier and the E/O converter to achieve a required spectrum shaping.

10. A driver chip as recited in claim 8 wherein the taps of the tapped delay equalizer are weighted to minimize impairments to the output signal caused by distortions and mismatch values introduced during creation and transmission of the optical signal, $\lambda$.

11. A driver chip as recited in claim 8 wherein there is a distance L between the driver chip and the E/O converter, and wherein the distance L is established to have 2L be less than one half of the total tapped delay of the tapped delay equalizer ($2L \leq \Sigma d_n/2$).

12. A driver chip as recited in claim 8 wherein the taps of the tapped delay equalizer are weighted to collectively minimize impairments caused by transmission line losses, electrical and photonic signal distortions, and signal characteristics.

13. A driver chip as recited in claim 8 wherein the taps of the tapped delay equalizer are weighted to set a bias point for the E/O device.

14. A driver chip as recited in claim 8 wherein the taps of the tapped delay equalizer are weighted to establish default values for respective tap weights of the tapped delay equalizer.

15. A driver chip as recited in claim 8 wherein the time delay, $d_n$, is established to create a sampling rate, s, for the tapped delay equalizer with $s > R_s$ to boost the transmission rate capability of the electrical output signal.

16. A driver chip as recited in claim 8 wherein a combined efficacy of weighted taps of the tapped delay equalizer is evaluated by monitoring an eye diagram.

17. A system for transmitting optical signals which includes a transmitter comprising:
   a source for generating a digital signal, wherein the digital signal is characterized by a symbol rate, $R_s$, with a time duration, T, for each symbol;
   a tapped delay equalizer for receiving an input digital signal, wherein the equalizer has an n-number of taps with a time delay, $d_n$, between adjacent taps, wherein $n > 3$, $R_s = 1/T$ and $d_n < T$, and further wherein the tapped delay equalizer modifies the input digital signal to create a compensated signal;
   an amplifier connected with the tap delay equalizer for receiving the compensated signal, wherein the amplifier includes a biasing element to establish an electrical output signal from the compensated signal having a predetermined bias;
   an equalizer control for weighting respective taps of the tapped delay equalizer to minimize impairments introduced into the electrical output signal by the system;
   a low pass filter to achieve a required spectrum shaping;
   an Electrical/Optical (E/O) device for converting the electrical output signal to an optical signal, $\lambda$; and
   an optical fiber for receiving the optical signal, $\lambda$, from the low pass filter for transmission of the optical signal, $\lambda$, over the optical fiber.

18. A system as recited in claim 17 including a Clock Data Recovering (CDR) chip connected to the optical fiber for receiving the optical signal, $\lambda$, for use in retiming the symbol rate, $R_s$.

19. A system as recited in claim 17 wherein control circuitry is interconnected with the amplifier to control a gain and a bias of the E/O device, and is interconnected with the tapped delay equalizer to control tap weights for individual taps of the tapped delay filter, to respectively minimize impairments for the output signal and to boost a signal transmission rate of the driver chip for a transmission of the electrical output signal as an optical signal over an optical fiber.

20. A system as recited in claim 17 wherein the weighting of taps for the tapped delay filter is accomplished, in combination, to minimize impairments to the output signal caused by transmission line losses, electrical and photonic signal distortions, and signal characteristics and further wherein a combined efficacy of weighted taps of the tapped delay equalizer is evaluated by monitoring an eye diagram.

* * * * *